July 23, 1935.                    M. L. KING                    2,009,051
                              AUTOMOBILE TRUNK
                            Filed July 11, 1934                2 Sheets-Sheet 1
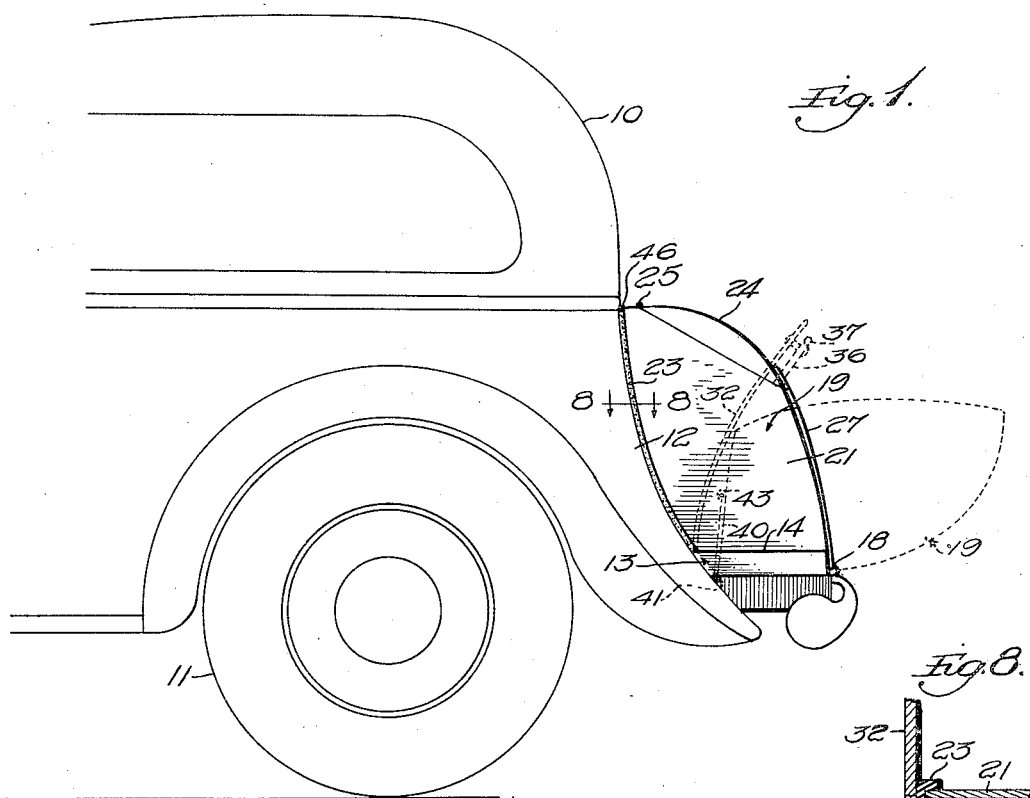
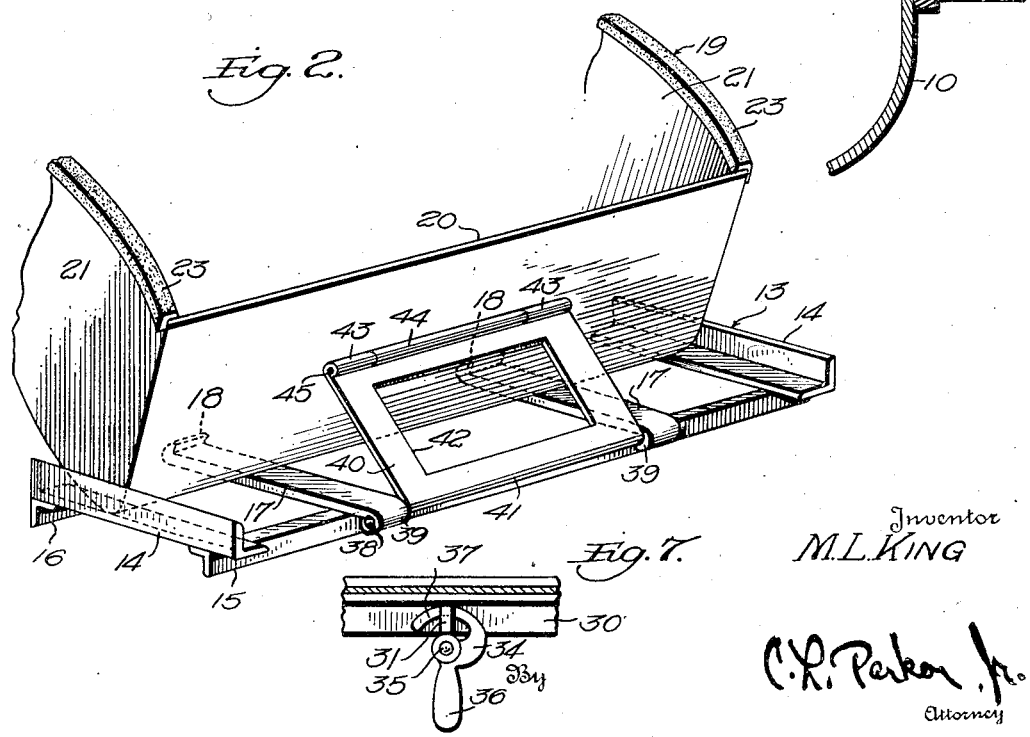
Inventor
M. L. KING
C. L. Parker Jr.
Attorney July 23, 1935.  M. L. KING  2,009,051
AUTOMOBILE TRUNK
Filed July 11, 1934   2 Sheets-Sheet 2
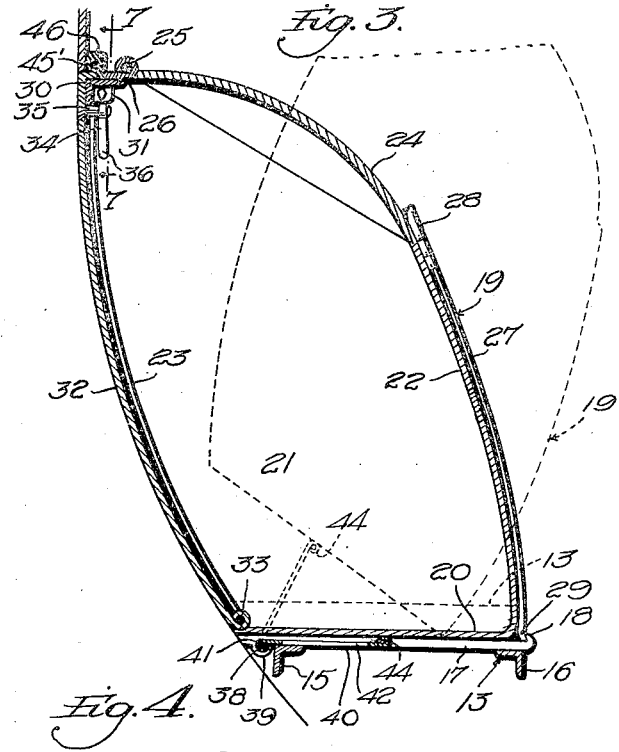
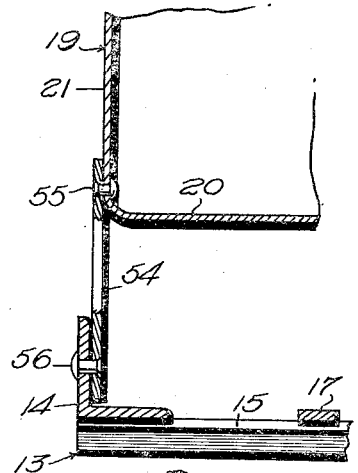
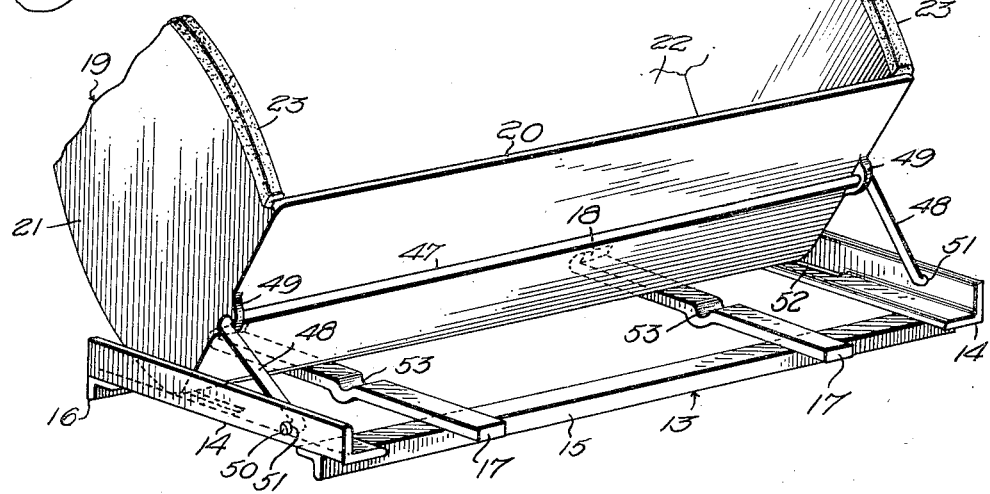
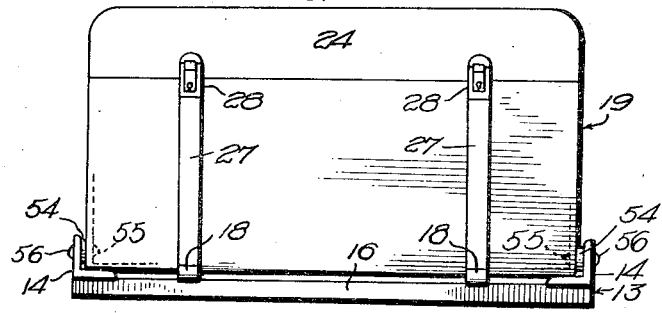
Inventor
M. L. KING
C. L. Parker Jr.
Attorney Patented July 23, 1935

2,009,051

UNITED STATES PATENT OFFICE 2,009,051

AUTOMOBILE TRUNK

Morgan L. King, Carthage, Mo., assignor to Mid-West Steel Products Corporation, Carthage, Mo.

Application July 11, 1934, Serial No. 734,667

17 Claims. (Cl. 224—29)

This invention relates to automobile trunks and is an improvement over my prior Patent No. 1,884,736, granted October 26, 1932.

In my prior patent referred to I have disclosed an automobile trunk structure including a trunk unit adapted to assume a vertical position in close proximity to the rear end of the vehicle body and movable to a horizontal position when desired. Suitable means are provided for guiding the trunk between its vertical and horizontal positions and such means included substantial triangular brackets outwardly of the ends of the trunk and slotted to receive outstanding pins carried by the trunk whereby the latter might be guided between its positions referred to.

An important object of the present invention is to provide a simplified form of means operative for permitting the trunk to be moved from vertical to horizontal positions.

A further object is to provide a device of the character referred to wherein the simplified means for controlling the movement of the trunk is substantially invisible when the trunk is in vertical position, thus improving the appearance of a trunk of this character.

A further object is to provide a trunk for the rear end of a motor vehicle which readily may be designed to conform to the vehicle body design to add materially to the appearance of the vehicle as a whole.

A further object is to provide a motor vehicle trunk of the character referred to which has its forward edge, when in vertical position, shaped to conform to the shape of the body to fit snugly thereagainst and thus present the appearance of an integral trunk, and to provide means for clamping the trunk securely in such position to prevent any movement of the trunk or any rattling thereof.

A further object is to provide a novel structure for clamping the trunk in the position referred to wherein a single fastening element is employed, thus permitting the trunk to be released for movement to horizontal position by the mere unfastening of such single fastening element.

A further object is to provide simple and novel link means connected between the trunk and the supporting rack therefor for controlling the movement of the trunk as it is moved between vertical and horizontal positions, the trunk in the latter position increasing the normal carrying capacity of the trunk by acting as an open-topped tray.

A further object is to provide a trunk of the character referred to having its forward face open, when in vertical position, and snugly engaging against the rear end of the motor vehicle body whereby the latter forms the forward wall of the trunk without the provision of any separate forward wall as in my prior patent referred to, and wherein such forward wall is pivotally connected to the vehicle body to be moved outwardly therefrom when the trunk is in horizontal position, thus permitting the space in the rear end of the body to be employed for storage purposes.

A further object is to provide a trunk for vehicles which will have all the uses of a plain trunk when in a vertical or trunk position, and which can be changed easily and quickly to a horizontal position forming an open tray capable of carrying packages too large to be placed in the usual trunk.

A further object is to provide a trunk of the character referred to which operates to conceal the presence of a rear door in the vehicle body, and which renders such door easily accessible merely by moving the trunk to horizontal position.

Other objects and advantages of the invention will become apparent during the course of the following description.

In the drawings I have shown several embodiments of the invention. In this showing:

Figure 1 is a side elevation of the rear portion of a motor vehicle showing the invention applied, Figure 2 is a fragmentary perspective view of a portion of the trunk and the supporting and operating means therefor, Figure 3 is a central vertical sectional view taken through the trunk and associated parts longitudinally with respect to the vehicle, Figure 4 is a fragmentary perspective view similar to Figure 2, showing a modified form of operating means, Figure 5 is a rear elevation of the trunk and the supporting means therefor, showing a modified operating means, Figure 6 is a fragmentary vertical sectional view through a trunk showing the latter form of operating means, the trunk being shown in elevated position, Figure 7 is a fragmentary detail sectional view on line 7—7 of Figure 3, and, Figure 8 is a fragmentary detail sectional view taken substantially on line 8—8 of Figure 1.

Referring to Figure 1, the numeral 10 designates the rear portion of a motor vehicle body supported upon the usual rear wheels 11. The lower rear extremity of the vehicle body is curved downwardly and rearwardly as at 12 to form a beaver tail design in accordance with the present practice.

The device forming the subject matter of the present invention comprises a supporting rack indicated as a whole by the numeral 13 and comprising a pair of side frame members 14 preferably formed of channel iron and connected forwardly and rearwardly by transverse channels or other connecting members 15 and 16, as shown in Figure 2. Slide rails 17 are connected at their forward and rear ends to the channels 15 and 16 respectively, and the rear end of each rail 17 is turned upwardly as at 18 to form a clamping hook for a purpose to be described. The frame 13, as will be apparent, may be supported in any suitable manner with respect to the vehicle chassis, and such means per se, forms no part of the present invention.

A trunk indicated as a whole by the numeral 19 is supported by the rack 13. The trunk includes a bottom wall 20, side walls 21 and a rear wall 22. The forward portion of the trunk, when in the position shown in Figures 1 and 3, is open, and the rear portion 12 of the vehicle forms the forward wall of the trunk under such conditions. The forward edges of the side walls 21 are shaped to conform to the shape of the portion of the body of the vehicle adjacent which they are arranged, and a rubber packing strip 23 is carried by the forward edge of each side wall 21 to engage against the vehicle body, thus forming a cushion for the trunk and preventing the rattling of the trunk against the body. Moreover, the packing strips serve to provide a leak-proof joint at each side of the trunk.

The trunk further comprises a lid or cover 24 which curves downwardly and rearwardly to form a continuation of the rear wall 22 of the trunk, when the cover is closed, and such cover is pivotally connected as at 25 to a strip 26 extending transversely of the vehicle and connected to the upper forward portions of the end walls 21. The rear wall 22 of the trunk may be provided with ornamental reinforcing strips 27, and suitable means is preferably carried by the upper end of each strip 27 for securing the cover 24 in closed position. Any suitable fastening means may be employed for this purpose such as the ordinary turn-up fasteners 28. The lower ends of the strips 27 are turned outwardly slightly as at 29, for a purpose to be described.

Referring to Figures 3 and 7, the numeral 30 designates an angle member or similar brace extending longitudinally with respect to the transverse strip 26 and secured thereto by welding or any suitable means. The angle member 30 serves to effectively brace the top of the trunk when open or closed, and preferably centrally of its length this member is provided with an eye 31 welded or otherwise secured thereto. This eye is utilized for fastening the trunk in vertical position, in a manner to be described.

The rear portion of the body of the vehicle may be integral, or it may be formed with a door 32 pivotally connected to the body at its lower end, as at 33. If the door 32 is employed, this door preferably is of the same size as the open forward face of the trunk so as to be sealed thereby in a manner to be described. The door 32 may be opened under conditions to be described to provide access to the inside of the rear portion of the body, which thus may be used as a storage compartment. A latch member 34 is pivotally connected as at 35 adjacent the upper edge of the door 32 substantially centrally thereof. This latch is provided with an operating handle 36 and with a cam finger 37 adapted to engage within the eye 31 to lock the trunk in closed position with respect to the door 32.

The operation of the handle 36 and finger 37 clamps the top forward edge portion of the trunk downwardly and inwardly with respect to the vehicle body. In this connection, it will be noted that the outwardly turned ends 29 of the ornamental strips 27 are engaged by the clamp hooks 18 when the trunk is in vertical position, and the clamping of the trunk in such position by operation of the latch member 34 causes the members 29 to tightly engage the hook members 18, thus effectively clamping the trunk in position and preventing the rattling thereof.

It will be noted that when the trunk is clamped in vertical position in the manner stated, the packing strips 23 engage tightly against the rear end of the vehicle body, thus assisting in preventing rattling as well as cushioning the trunk against the body and forming a leak-proof joint between the trunk and the body. The door 32 preferably is of the same width as the trunk transversely of the vehicle, and the side edges of the door thus preferably terminate in the planes of the end walls 21, as shown in Figure 8. The packing strips 23 therefore act also to seal the door 32 against leakage, and they also prevent this door from rattling during the operation of the vehicle.

Means are provided for connecting the trunk to the supporting rack in such a manner as to facilitate the movement of the trunk between vertical and horizontal positions. One type of means for this purpose is illustrated in detail in Figure 2 of the drawings. A hinge pin 38 is supported at its ends in ears 39 formed integral with the rails 17. A link member indicated by the numeral 40 has one end rolled as at 41 to receive the pin 38 whereby the link member is pivotally connected to the rails 17. It will be apparent that the link member is of substantial length transversely of the vehicle and is preferably formed of a stamped steel plate, the central portion of which may be cut out as at 42. The side of the link member opposite the rolled edge 41 is provided with hinge members 43 coacting with a corresponding hinge member 44, carried by the bottom wall 20 of the trunk to receive a hinge pin 45. The length of the two hinge connections of the link member 40 are such as to provide substantial stability in the movement of the trunk between its two positions in a manner to be referred to, to maintain an accurate parallel relationship between the trunk and its supporting rack.

From its vertical position, the trunk is adapted to be swung in the manner indicated in dotted lines in Figure 3 to assume the horizontal position shown in Figure 1, such movement being permitted through the operation of the link member 40. No means has been disclosed for locking the trunk in horizontal position, although it will be apparent that any suitable means may be employed for this purpose, if desired. In practice it has been found that there is no reason for moving the trunk to horizontal position unless it is desired to carry a load therein, in which case the load efficiently holds the trunk in horizontal position. In this connection, it will be noted that when the trunk is in horizontal position, the link member is arranged substantially vertically thus effectively preventing any vertical movement of the adjacent end of the trunk. When the trunk is in vertical position, as shown in solid lines in Figure 3, the latch member 34 locks the trunk against movement by engagement with the eye 31. This eye is shown as being carried by the door 32, but as previously stated, the rear end of the car may be continuous and unbroken, in which case the latch member 34 is carried by the vehicle body proper. Where the door 32 is employed, suitable packing may be used for providing a leak-proof joint around the edges of the door and between the door and the adjacent edge of the trunk. In the present instance, the door is illustrated as being provided with an outwardly offset flange 45' at its upper end, and this flange receives a rubber or similar packing strip 46. This strip has one portion engaging the adjacent portion of the vehicle body and another portion engageable by the adjacent edge of the trunk, thus cushioning the contacting parts and preventing the rattling thereof, as well as providing the leak-proof joints referred to.

In Figure 4 of the drawings a somewhat modified form of link connection between the trunk and its supporting rack is illustrated. In such form of the invention, a preferably unitary bar indicated as a whole by the numeral 47 extends across the bottom 20 of the trunk and has its end portions turned to form link members 48. The bar 47 is pivotally connected to the trunk by passing through ears 49 formed at the lower edges of the end walls 21. The free ends of the links 48 are pivotally connected with respect to the angle members 14 by having their extremities turned outwardly as at 50 to extend through openings 51 formed in the angle members 14.

To permit the trunk bottom 20 to rest upon the angle members 14 and rails 17, the former are provided with slots 52 to receive the ears 49, while the rails 17 are transversely recessed as at 53 to receive the bar 47. The connection between the links 48 by the bar 47 maintains the links 48 in the same plane at all times, thus providing the desired degree of stability in the movement of the trunk without any looseness or wobbling thereof.

A simplified but not quite so satisfactory link arrangement is illustrated in Figures 5 and 6. Separate links 54 are arranged at opposite ends of the trunk between the end walls 21 thereof and the vertical flanges of the angle member 14. Each link 54 is connected at its ends to the trunk and the adjacent angle member 14 as at 55 and 56 respectively. The device is fully operative with the use of the links 54, and in the absence of any connection between these links, the parallel relationship between the trunk and the supporting rack is not maintained throughout the movement of the link between its vertical and horizontal positions.

The operation of the device will be apparent from the foregoing description. When the trunk is moved to vertical position and substantially reaches such position, the outturned ends 29 of the strips 27 engage the clamp hooks 18. With the cover 24 of the trunk open, the single fastening member 34 is operated to move the cam finger 37 through the eye 31 to clamp the trunk in vertical position. The clamping action occurring through the operation of the latch member 34 causes the trunk to move to a slight extent, pivoting about the lower extremity of the ends 29 of the strips 27. Accordingly the clamping action causes the forward end of the trunk to swing both downwardly and forwardly to a slight extent at the same time exerting pressure between the members 29 and 18. At the latter point, the tight clamping action occurs, and the slight downward movement of the forward portion of the trunk causes the bottom thereof to tightly engage against either the angle members 14 or 5 rails 17, and preferably against both of these elements. The packing strips 23 and 46 are caused to be clamped tightly against their respective parts to prevent leakage and rattling. As previously stated, the packing strips 23 engage the body at the side limits of the door 32, when such door is employed, thus providing leak-proof joints both for the trunk and door and assisting in preventing the door from rattling.

When it is desired to move the trunk to horizontal position to employ it as a luggage tray, the cover 24 is opened and the latch 34 released, whereupon the cover 24 is closed and latched and the trunk is ready to be moved to horizontal position. By pulling rearwardly on the upper portion of the trunk, the lower rear portion of the trunk will move forwardly with respect to the supporting rack, with the strip ends 29 sliding along the rails 17. The lower forward portion of the trunk is permitted to move upwardly and away from the vehicle body by virtue of the form of link connection employed, and such link connection acts to guide the trunk in its movement and at the same time maintain the parallel relationship between the trunk and the rack, except in the form of the invention shown in Figure 6. In the latter form of device, however, there is little tendency for the trunk to wobble, since the sliding contact of the strip ends 29 on the rails tends to guide the trunk in its movement. The trunk overhangs the rear end of the supporting rack when in horizontal position, and the rear portion of the trunk under such conditions is supported by the rack. The forward portion of the trunk when in horizontal position, is fixed against vertical movement by the link connection, and accordingly the trunk forms an open topped tray which may be packed with luggage or other articles.

When the door 32 is employed, such door may be opened as indicated in dotted lines in Figure 1, when the trunk is in horizontal position, thus permitting the space in the rear end of the vehicle to be used as a storage compartment for a spare tire, luggage or the like. Any suitable means (not shown) may be employed for locking the door 32 in closed position. Only the single latch 34 need be employed for locking the trunk in vertical position, and the use of the angle member 30 prevents any sagging of the adjacent portion of the trunk when the latch 34 is closed to exert the clamping action referred to.

From the foregoing it will be apparent that the present device lends itself particularly well to a design which harmonizes with the present trend in motor vehicle design, and the link means employed for guiding the trunk between vertical and horizontal positions is substantially entirely hidden from view when the trunk is in its normal or vertical position. The cost of manufacture of the device is substantially less than is true of most structures of this type, and it is adapted to be moved between its two positions very easily. The use of the single latching member greatly increases the facility with which the device may be released from or locked in vertical position.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. The combination with a motor vehicle, of a rack supported by a portion of the vehicle body, a trunk arranged on said rack and having a face engageable against the vehicle body when in vertical position, link means pivotally connected at one end to said trunk and at the other end to said rack to control movement of said trunk between vertical and horizontal positions, and means for securing said trunk against movement from vertical position.

2. The combination with a motor vehicle, of a rack supported by a portion of the vehicle body, a trunk arranged on said rack and having a face engageable against the vehicle body when in vertical position, link means pivotally connected at one end to said trunk and at the other end to said rack to control movement of said trunk between vertical and horizontal positions, means carried by said rack and engageable with said trunk when the latter is in vertical position to prevent movement of the lower portion of said trunk away from the vehicle body, and means operable when said trunk is in vertical position for securing the upper part thereof to the vehicle body.

3. The combination with a motor vehicle, of a rack supported by a portion of the vehicle body, a trunk arranged on said rack and having a face engageable against the vehicle body when in vertical position, link means pivotally connected at one end to said trunk and at the other end to said rack to control movement of said trunk between vertical and horizontal positions, hook means carried by said rack and engageable with the lower rear portion of said trunk when the latter is in vertical position to prevent rearward movement of the lower portion of said trunk, and means for securing the upper forward portion of said trunk to the vehicle body when said trunk is in vertical position.

4. The combination with a motor vehicle, of a rack supported by a portion of the vehicle body, a trunk normally vertically arranged on said rack with one face engaging against the vehicle body, link means normally horizontally arranged when said trunk is in vertical position with the end of said link means remote from the vehicle body pivotally connected to said trunk adjacent the bottom thereof and with the other end of said link means pivotally connected to said rack, said link means being of a length to permit the swinging of said trunk from vertical to horizontal position, and means for securing said trunk against movement from vertical position.

5. The combination with a motor vehicle, of a rack supported by a portion of the vehicle body, a trunk normally vertically arranged on said rack with one face engaging against the vehicle body, link means connected at one end to said trunk adjacent the rear bottom portion thereof when said trunk is in vertical position and at its other end to said rack at a point forwardly of the pivotal connection of the first named end of said link, and means for securing said trunk against movement from vertical position.

6. The combination with a motor vehicle, of a rack supported by a portion of the vehicle body and including a pair of rails, a trunk arranged on said rack and slidable along said rails for movement between vertical and horizontal position, and link means connected at its ends respectively to said trunk and said rack to control movement of said trunk between vertical and horizontal positions.

7. The combination with a motor vehicle, of a rack supported by a portion of the vehicle body and including a pair of rails, a trunk arranged on said rack and slidable along said rails for movement between vertical and horizontal position, link means connected at its ends respectively to said trunk and said rack to control movement of said trunk between vertical and horizontal positions, means engaging said trunk adjacent the bottom thereof when in vertical position to prevent movement of the bottom portion of said trunk away from the vehicle, and means for securing the top portion of said trunk to said vehicle body when the trunk is in vertical position.

8. The combination with a motor vehicle, of a rack supported by a portion of the vehicle body and including a pair of rails, a trunk arranged on said rack and slidable along said rails for movement between vertical and horizontal positions, link means connected at its ends respectively to said trunk and said rack to control movement of said trunk between vertical and horizontal positions, the ends of said rails remote from the vehicle body having upturned ends forming hooks engageable with the trunk when in vertical position to prevent movement of the bottom of the trunk away from the vehicle body, and means for securing the upper portion of said trunk to said vehicle body.

9. The combination with a motor vehicle, of a rack supported by a portion of the vehicle body, a trunk normally vertically arranged on said rack, a plate substantially horizontally arranged when said trunk is in vertical position, and a pair of elongated parallel hinge pins connecting opposite edge portions of said plate respectively to said trunk at a point remote from the vehicle body and to said rack at a point closer to the vehicle body, said plate constituting a link operative for guiding said trunk between vertical and horizontal positions.

10. The combination with a motor vehicle, of a rack supported by a portion of the vehicle body, a trunk normally vertically arranged on said rack, a plate substantially horizontally arranged when said trunk is in vertical position, a pair of elongated parallel hinge pins connecting opposite edge portions of said plate respectively to said trunk at a point remote from the vehicle body and to said rack at a point closer to the vehicle body, said plate constituting a link operative for guiding said trunk between vertical and horizontal positions, means engaging said trunk adjacent the bottom thereof for preventing movement of the latter away from the vehicle body when said trunk is in vertical position, and means operative when said trunk is in vertical position for securing the top portion of said trunk to the vehicle body.

11. The combination with a motor vehicle, of a rack supported by a portion of the vehicle body, a trunk normally vertically arranged on said rack, a plate substantially horizontally arranged when said trunk is in vertical position, a pair of elongated parallel hinge pins connecting opposite edge portions of said plate respectively to said trunk at a point remote from the vehicle body and to said rack at a point closer to the vehicle body, said plate constituting a link operative for guiding said trunk between vertical and horizontal positions, said rack including a pair of sliding rails engageable with the trunk during movement of the latter between vertical and horizontal positions, the ends of said rails remote from the vehicle body having upturned hook portions engageable with the bottom portion of the trunk when the latter is in vertical position, and means operative when said trunk is in vertical position for securing the top portion of said trunk to the vehicle body.

12. The combination with a motor vehicle, of a rack supported by a portion of the vehicle body, a trunk normally vertically arranged on said rack and movable to horizontal position thereon, and a substantially U-shaped member having its base portion extending across the bottom portion of said trunk at a point remote from the vehicle body and pivoted with respect thereto, the free ends of the arm portions of said U-shaped member being pivotally connected to said rack on an axis adjacent the vehicle body, said arm portions constituting links fixed with respect to each other by said base portion and operative for guiding said trunk for movement between vertical and horizontal positions.

13. The combination with a motor vehicle, of a rack supported by a portion of the vehicle body and including opposite parallel frame members, a trunk normally vertically arranged on said rack and movable thereon to horizontal position, and a pair of links pivotally connected at one end on a common axis to said trunk adjacent the bottom thereof and remote from the vehicle body, the other ends of said links being pivotally connected respectively to said frame members on a common axis adjacent the vehicle body.

14. The combination with the rear end portion of a motor vehicle having an opening therein, of a door pivoted to the vehicle body and normally closing said opening, a rack supported by the vehicle body and projecting therefrom beneath said door, a trunk normally vertically arranged on said rack and having an open forward face, the forward edge of said trunk corresponding in shape and size to said door and engaging against the vehicle body, link means pivotally connected at one end to the bottom portion of said trunk on a horizontal axis remote from the vehicle body and at the other end to said rack on a horizontal axis adjacent the vehicle body, and means operative when said trunk is in vertical position against the vehicle body for securing it in position with respect thereto.

15. The combination with the rear end portion of a motor vehicle having an opening therein, of a door pivoted to the vehicle body and normally closing said opening, a rack supported by the vehicle body and projecting therefrom beneath said door, a trunk normally vertically arranged on said rack and having an open forward face, the forward edge of said trunk corresponding in shape and size to said door and engaging against the vehicle body, packing means extending around the top and side edges of the forward face of said trunk, said packing means engaging said trunk, said door and the vehicle body, link means pivotally connected at one end to the bottom portion of said trunk on a horizontal axis remote from the vehicle body and at the other end to said rack on a horizontal axis adjacent the vehicle body, and means operative when said trunk is in vertical position against the vehicle body for securing it in position with respect thereto.

16. The combination with the rear end portion of a motor vehicle having an opening therein, of a door pivoted to the vehicle body and normally closing said opening, a rack supported by the vehicle body and projecting therefrom beneath said door, a trunk normally vertically arranged on said rack and having an open forward face, the forward edge of said trunk corresponding in shape and size to said door and engaging against the vehicle body, link means pivotally connected at one end to the bottom portion of said trunk on a horizontal axis remote from the vehicle body and at the other end to said rack on a horizontal axis adjacent the vehicle body, means carried by said rack at the rear end thereof and engageable with the rear bottom portion of said trunk to prevent movement thereof away from the vehicle body when said trunk is in vertical position, and means operable when said trunk is in vertical position for clamping the forward upper portion of said trunk inwardly and downwardly with respect to the vehicle body.

17. The combination with the rear end portion of a motor vehicle having an opening therein, of a door pivoted to the vehicle body and normally closing said opening, a rack supported by the vehicle body and projecting therefrom beneath said door, a trunk normally vertically arranged on said rack and having an open forward face, the forward edge of said trunk corresponding in shape and size to said door and engaging against the vehicle body, packing means extending around the top and side edges of the forward face of said trunk, said packing means engaging said trunk, said door and the vehicle body, link means pivotally connected at one end to the bottom portion of said trunk on a horizontal axis remote from the vehicle body and at the other end to said rack on a horizontal axis adjacent the vehicle body, means carried by said rack at the rear end thereof and engageable with the rear bottom portion of said trunk to prevent movement thereof away from the vehicle body when said trunk is in vertical position, and means operable when said trunk is in vertical position for clamping the forward upper portion of said trunk inwardly and downwardly with respect to the vehicle body.

MORGAN L. KING.